J. R. PERRY.
PIPE, CIGAR HOLDER, &c.
APPLICATION FILED NOV. 13, 1908.
936,734.
Patented Oct. 12, 1909.
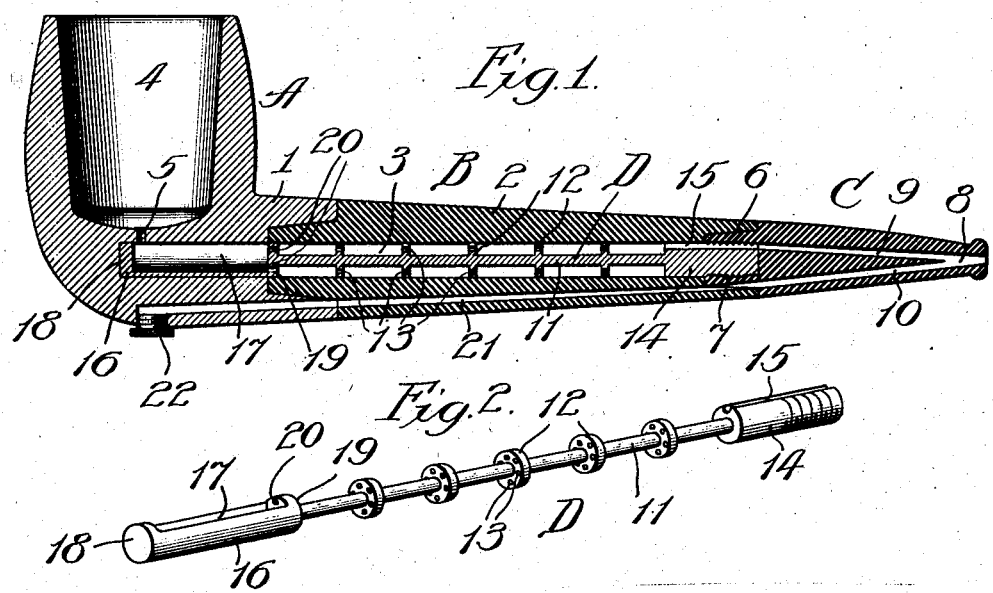
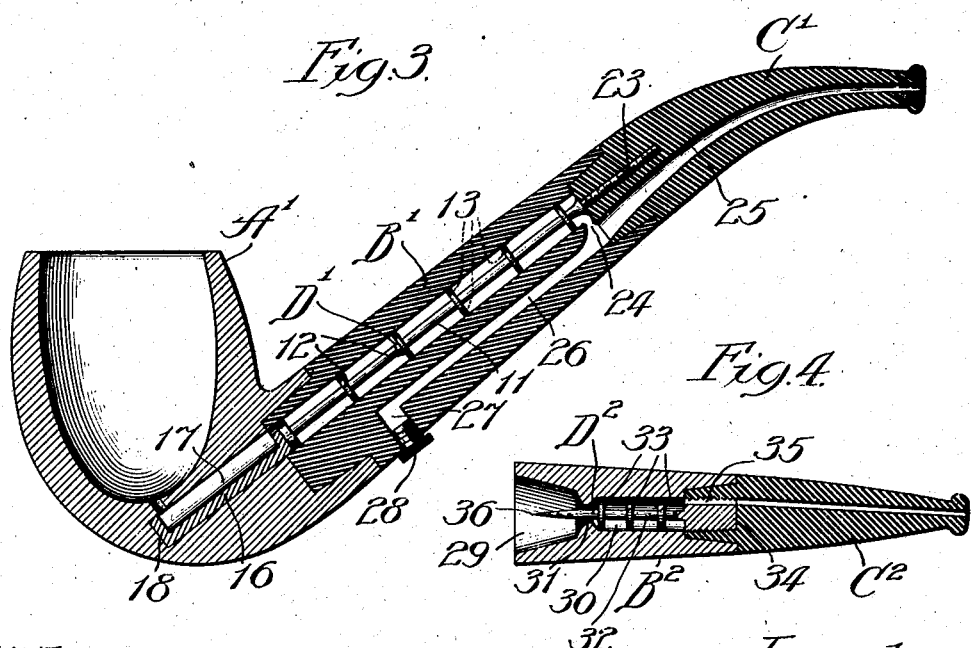
Witnesses:
John Enders
Chas. H. Buell
Inventor:
John R. Perry.
By Dyrenforth, Lee, Chritton & Wiles
Attys.

UNITED STATES PATENT OFFICE.

JOHN R. PERRY, OF CHICAGO, ILLINOIS, ASSIGNOR TO PERRY PIPE COMPANY, OF CHICAGO, ILLINOIS, A CORPORATION OF ILLINOIS.

PIPE, CIGAR-HOLDER, &c.

936,734.

Specification of Letters Patent.   Patented Oct. 12, 1909.

Application filed November 13, 1908.  Serial No. 462,407.

*To all whom it may concern:*

Be it known that I, JOHN R. PERRY, a citizen of the United States, residing at Chicago, in the county of Cook and State of Illinois, have invented a new and useful Improvement in Pipes, Cigar-Holders, &c., of which the following is a specification.

My invention relates particularly to means for separating nicotin from tobacco-smoke in pipes, cigar-holders and cigarette-holders; and my primary object is to provide a stem-construction which will enable the above-indicated object to be attained, said construction being capable of being cheaply manufactured and also being readily cleanable.

The invention is illustrated in its preferred embodiment in the accompanying drawing, in which—

Figure 1 represents a sectional view of a straight-stem pipe constructed in accordance with my improvements; Fig. 2, a perspective view of a removable nicotin-collector employed; Fig. 3, a sectional view of a curved-stem pipe constructed in accordance with my improvements; and Fig. 4, a sectional view of a cigar-holder constructed in accordance with my invention.

Referring to Figs. 1 and 2, A represents a pipe-bowl; B, a stem connected with said bowl; C, a mouth-piece detachably connected with said stem; and D, a nicotin-collector housed within the stem B and secured to the mouth-piece C, so as to be removable therewith. The stem B, in the construction illustrated, comprises a short section 1 formed integrally with the base of the bowl, and a removable section 2 having slip-joint connection with the section 1. The stem is formed with a comparatively large bore 3 which extends beneath the bottom of the chamber 4 of the bowl, connecting therewith by a small perforation 5. The mouth-piece C preferably has slip-joint connection at 6 with the free end of the stem-section 2, and has in its base-end a short bore 7 which is threaded to receive the threaded shank of the device D. The point-end of the mouth-piece has an aperture 8 from which branch the smoke-passage 9 and saliva-passage 10, the former rising or inclining upwardly from the aperture 8 and the latter inclining downwardly from the aperture 8. The device D preferably comprises a rod 11 formed with disks 12 located at intervals thereon, said disks having small perforations 13 therethrough; a threaded shank 14 at one end of the rod 11 and of the same diameter as the disks 12, said shank 14 having its upper wall provided with a longitudinal groove, or smoke-passage 15; and a section, or member, 16 at the opposite end of the rod 11 having an open-top chamber 17 which extends beneath the perforation 5 and is provided with disk-form end-walls 18 and 19, the latter having smoke-passages 20 through it. As thus described, the device D may be formed conveniently of a rod turned down according to requirements to form the spaces between the disks, the portion 16 being hollowed out or dished to form the chamber 17; or said device may be molded or cast from any suitable material. The passage 15 registers with the inner end of the smoke-passage 9 of the mouth-piece, and the saliva-passage 10 of the mouth-piece registers with a saliva-passage 21 which extends through the stem B and is tapped by an outlet passage located beneath the bowl of the pipe and which is normally closed by a screw-plug 22.

In the construction shown in Fig. 3, $A^1$ represents the bowl of a pipe; $B^1$ the stem; $C^1$ a mouth-piece; and $D^1$ a nicotin-collector. The mouth-piece is curved and the exterior of the base-portion of the stem is curved to give the effect of a "curved-stem" pipe. The stem has a straight bore therethrough extending on an incline, as shown, and receiving the nicotin-collector $D^1$. The nicotin-collector $D^1$ is of the same construction as the nicotin-collector D, except that it has a reducing threaded stem 23 connected with the base-portion of the mouth-piece. The smoke-outlet from the bore containing the collector $D^1$ is through a passage 24 which communicates with a curved passage 25 through the mouth-piece. The stem has a saliva-passage 26 which communicates with the smoke-passage 24 and registers with the passage 25. The lower portion of the passage 26 is tapped by an outlet passage 27 which receives a screw-plug 28. The stem $B^1$ is sectionally constructed in the same manner as is the stem B, and the mouth-piece $C^1$ has slip-joint connection with the adjacent end of the stem $B^1$, being removable. When the mouth-piece is removed, the collector D¹ is withdrawn through the medium of the mouth-piece.

In each of the constructions described, the smoke passes through the minute perforations of the disks of the nicotin-collector, and the nicotin is deposited on the collector. In each construction, provision is made for preventing the saliva from passing through the nicotin-collector and reaching the bowl of the pipe. In other words, provision is made for keeping the tobacco dry and for preventing mixture of the saliva with the nicotin oils or juices. Also, in each case, the nicotin-collector is removable through the medium of the mouth-piece, the removal being effected without rotation of the mouth-piece; and the nicotin-collector is of such construction as to enable it to be readily cleansed.

The pipe may be constructed of any suitable material, and the nicotin-collector may be composed of any suitable material. The nicotin-collector is preferably, but not necessarily, of the integral construction shown.

In the construction shown in Fig. 4, B² represents the stem of a cigar-holder; C² the mouth-piece having slip-joint connection therewith; and D² a nicotin-collector having a screw-connection with the mouth-piece and removable from the stem B² through the medium of the mouth-piece. In this construction, the free end of the stem B² of the holder is provided with a recess or opening 29 adapted to receive the end of the cigar, and the stem is provided with a bore 30 which receives the collector D². The bore 30 connects, by a comparatively small passage 31, with the chamber 29. The collector D² comprises a rod 32 having perforate disks 33 thereon, and a shank 34 of approximately the same diameter as the disks 33 and having threaded connection with a bore in the adjacent end of the mouth-piece. The threaded shank 34 of the collector is provided at its upper portion with a groove or smoke-passage 35. At the opposite end of the collector, the rod 32 is extended through the passage 31 and projects into the chamber 29, where it is sharpened to form a point 36 which projects centrally into the chamber 29. The point 36 serves as a means of impaling the cigar and preventing the cigar from falling out of the holder. The point may also serve as a means of puncturing the cigar, avoiding the necessity of clipping the end thereof.

It is noteworthy that in each of the constructions described the mouth-piece and stem constitute a holder (in one case for the reception of the cigar directly, and in the other case for supporting the pipe-bowl containing the tobacco) and the nicotin-collector is withdrawable from the stem in the operation of removing the mouth-piece.

What I regard as new and desire to secure by Letters Patent is—

1. A pipe comprising a bowl provided with a tobacco-chamber and a smoke-passage communicating with the base-portion of said chamber, a stem connected with said bowl and provided with a bore extending beneath said smoke-passage, a mouth-piece connected with said stem, and a nicotin-collector contained in said bore, comprising a rod equipped with a plurality of perforate disks and an extension at the inner end thereof projecting beneath said smoke-passage and having a chamber beneath said smoke-passage, for the purpose set forth.

2. A pipe comprising a bowl, a stem connected with said bowl provided with a straight bore, a mouth-piece connected with said stem and provided with a smoke-passage, and a nicotin-collector comprising a rod equipped intermediately with perforate disks and having a chambered extension at one end extending beneath the pipe-bowl and an extension at the other end provided in its upper portion with a smoke-passage registering with the smoke-passage in said mouth-piece.

3. In a device of the character set forth, the combination of a stem provided with a straight smooth bore, a mouth-piece removably connected with said stem, and a nicotin-collector comprising a rod equipped with disks contacting directly with the walls of said bore and having smoke-passages therethrough, said nicotin-collector having a shank connected with said mouth-piece, whereby, when the mouth-piece is withdrawn, the nicotin-collector will be withdrawn and said disks will scrape the walls of said bore.

JOHN R. PERRY.

In presence of—
  J. G. ANDERSON,
  R. A. SCHAEFER.